United States Patent Office.

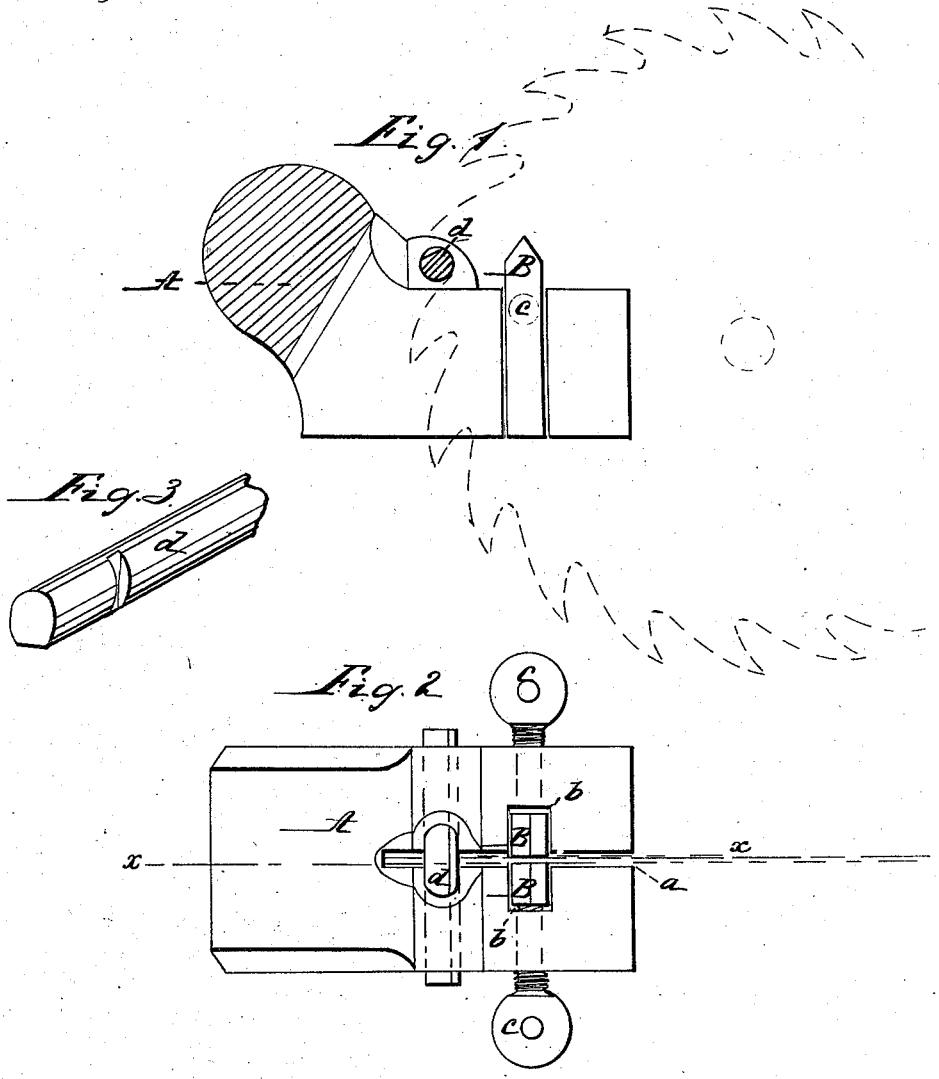

DAVID HUFFMAN, OF LURAY, VIRGINIA.

Letters Patent No. 83,383, dated October 27, 1868.

IMPROVED DEVICE FOR SHARPENING SAWS.

The Schedule referred to in these Letters Patent and making part of the same.

*To all whom it may concern:*

Be it known that I, DAVID HUFFMAN, of Luray, in the county of Page, and State of Virginia, have invented a new and improved Combined Vise and Anvil for Circular Saws; and I do hereby declare that the following is a full, clear, and exact description of the construction and operation of the same, reference being had to the accompanying drawings, making a part of this specification, in which—

Figure 1 is a vertical section through line $x\ x$ of fig. 2.

Figure 2 is a plan view.

One of the effects of the process of sawing lumber is that the teeth of the saw become worn narrower at their points that at their butts. To remedy this defect, before filing, it is often found expedient to drive upon the teeth a swage, which condenses them into proper shape. To hold the saw during the swaging-process, a vise is necessary. It is also frequently found desirable to hammer the teeth after the swaging-process, owing to the fact that during this process the teeth sometimes become chipped and otherwise flawed. To effect the hammering-operation, an anvil is necessary.

My invention, therefore, consists of an anvil and a vise combined, in a neat and portable shape, for the accomplishment of the above methods of treating saws.

In the drawings, A is a block, of cast-iron, of the shape shown, which is conceived to be a convenient one for the purpose referred to.

Longitudinally of the block is a slot, $a$, for the admission of a circular saw.

On each side of the slot $a$, and opening into it, are transverse recesses $b\ b$, in which are placed the jaws B B of my vise.

Screws $c\ c$ pass from each side of the block, through to the jaws B, by means of which the said jaws are made to clamp the saw during the swaging-process.

At a suitable distance back of the vise B is an anvil, $d$, consisting of a steel shaft, with one side flattened, passing through a transverse hole in the block, and capable of rotation in said hole, so as to accommodate its flattened surface to a tooth of any angle. The under side of the teeth is laid upon this flattened part, the block being shifted to the opposite of the saw when the anvil is to be used.

When a saw is in hand with teeth too small to reach the flattened face of the anvil, over the round part thereof, it may be inserted in the groove $d'$, cut for the purpose transversely of the anvil, the upper end of said groove being at the edge of the flat face.

This instrument is cheap, neat, and exceedingly convenient, and commends itself to the approval of every practical mill-man.

Having thus described my invention,

What I claim as new, and desire to secure by Letters Patent, is—

The block A, jaws B B, and screws $c\ c$, when constructed and arranged as described, and for the purpose set forth.

To the above specification of my invention, I have signed my hand, this 27th day of August, 1868.

DAVID HUFFMAN.

Witnesses:
CHAS. A. PETTIT,
S. C. KEMON.